United States Patent [19]
Rekers

[11] Patent Number: 4,799,724
[45] Date of Patent: Jan. 24, 1989

[54] GRIPPING DEVICE

[75] Inventor: Karl Rekers, Spelle, Fed. Rep. of Germany

[73] Assignee: Firma Dipl.-Ing. Karl Rekers Maschinenbau, Spelle, Fed. Rep. of Germany

[21] Appl. No.: 27,772

[22] Filed: Mar. 19, 1987

[30] Foreign Application Priority Data

Mar. 26, 1986 [DE] Fed. Rep. of Germany ....... 3610130

[51] Int. Cl.$^4$ .......................... B25J 15/10; B66C 1/66
[52] U.S. Cl. ............................. 294/87.26; 294/81.62; 294/87.1; 294/119.1
[58] Field of Search .................... 294/67.33, 67.5, 81.2, 294/81.54, 81.62, 86.4, 87.1, 87.2, 87.26, 90, 119.1; 269/104, 109, 112, 152, 216, 224, 263

[56] References Cited

U.S. PATENT DOCUMENTS

| | | | |
|---|---|---|---|
| 2,625,424 | 1/1953 | Hyman | 294/81.62 X |
| 3,212,808 | 10/1965 | Breslav et al. | 294/81.62 |
| 3,825,293 | 7/1974 | Schwarz | 294/119.1 X |
| 4,252,358 | 2/1981 | Klebs | 294/119.1 X |
| 4,336,926 | 6/1982 | Inagaki et al. | 294/119.1 X |
| 4,611,846 | 9/1986 | Feiber et al. | 294/119.1 X |

FOREIGN PATENT DOCUMENTS

| | | | |
|---|---|---|---|
| 3419187 | 11/1985 | Fed. Rep. of Germany | 294/119.1 |
| 120805 | 12/1970 | Norway | 294/119.1 |
| 802161 | 2/1981 | U.S.S.R. | 294/119.1 |

Primary Examiner—Johnny D. Cherry
Attorney, Agent, or Firm—Jordan and Hamburg

[57] ABSTRACT

The invention relates to a gripping device for supporting caps or the like supporting tops superimposed on the free upper end of concrete mouldings, such as concrete socket-pipes, standing upright. In order to be able to remove the supporting caps, even with different spacing between the ends of the pipes, in an automated manner, for example using a numerically controlled transport and lifting device, the gripping device comprises at least one group of gripping arms which are supported on a supporting frame and which can be moved inwards, out of an initial position into a position of engagement with a supporting cap by means of a common drive, the gripping arms being capable of being stopped independently of one another.

12 Claims, 5 Drawing Sheets

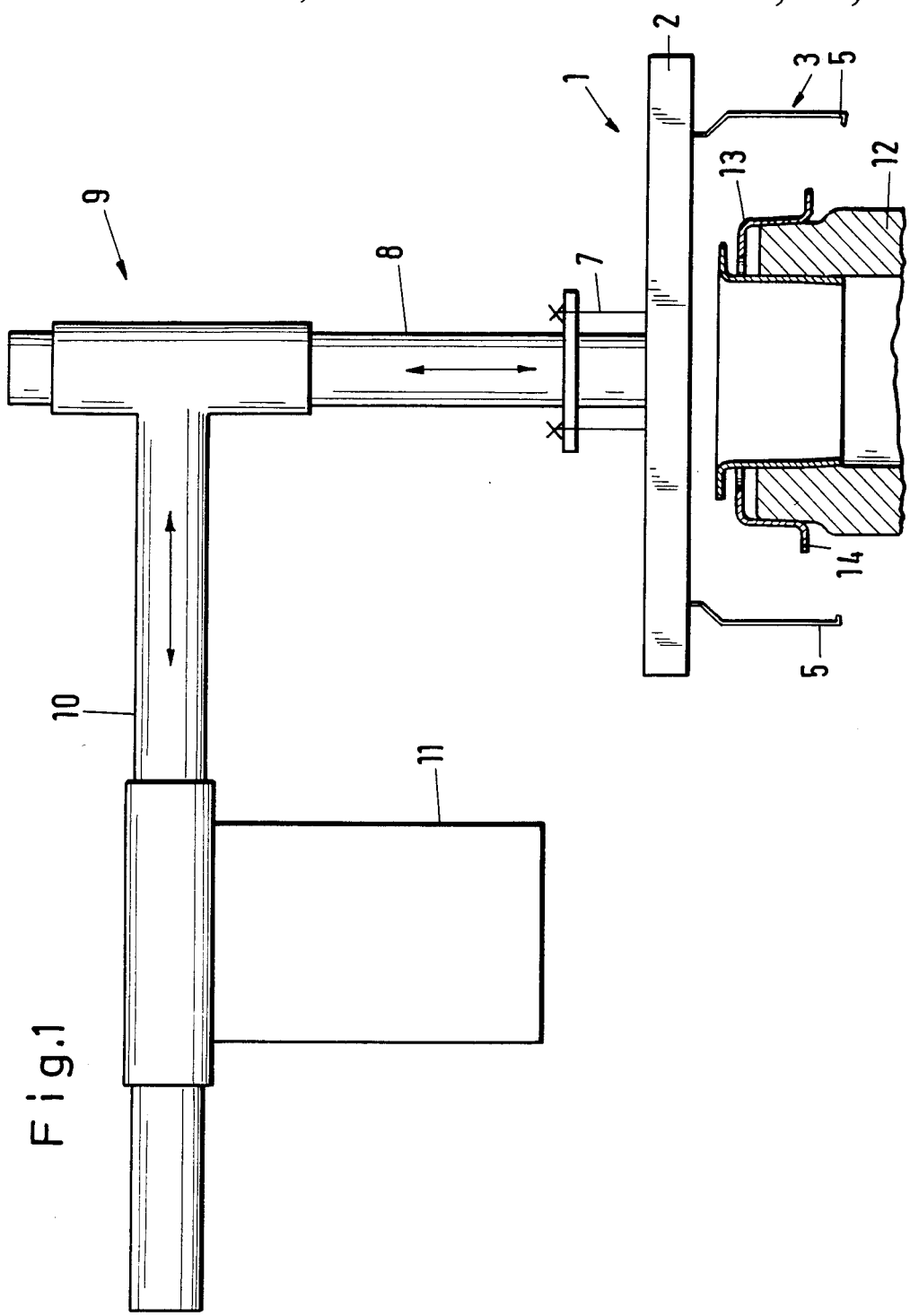

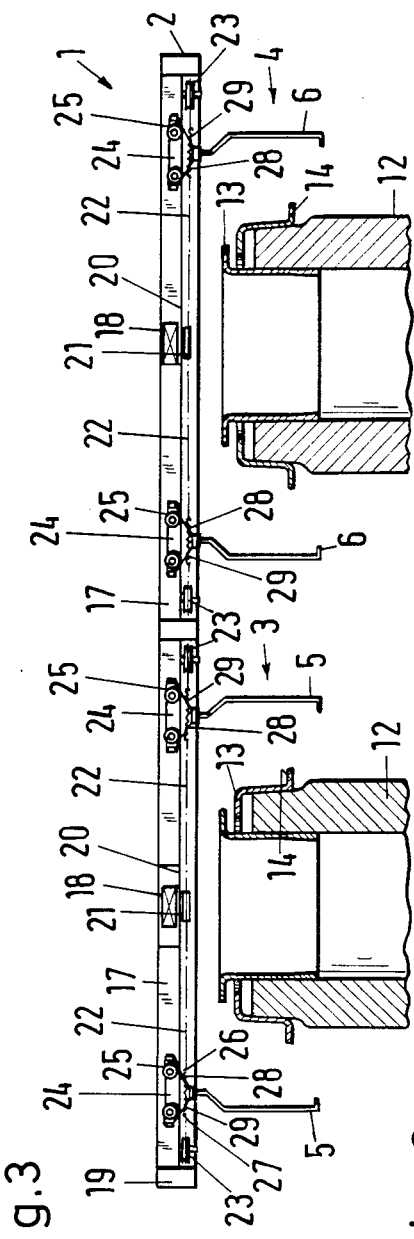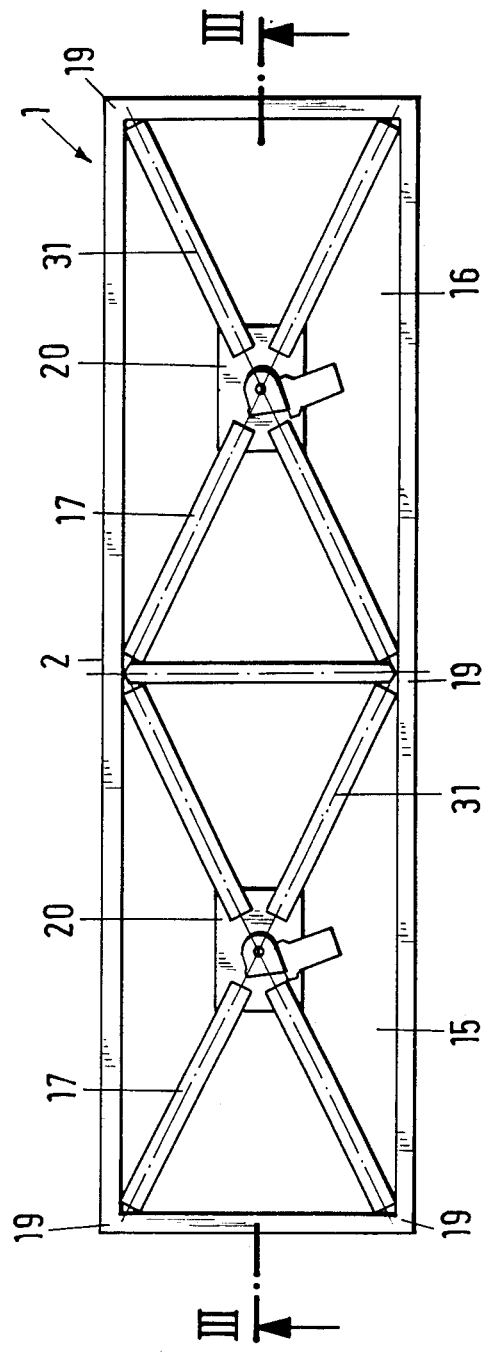

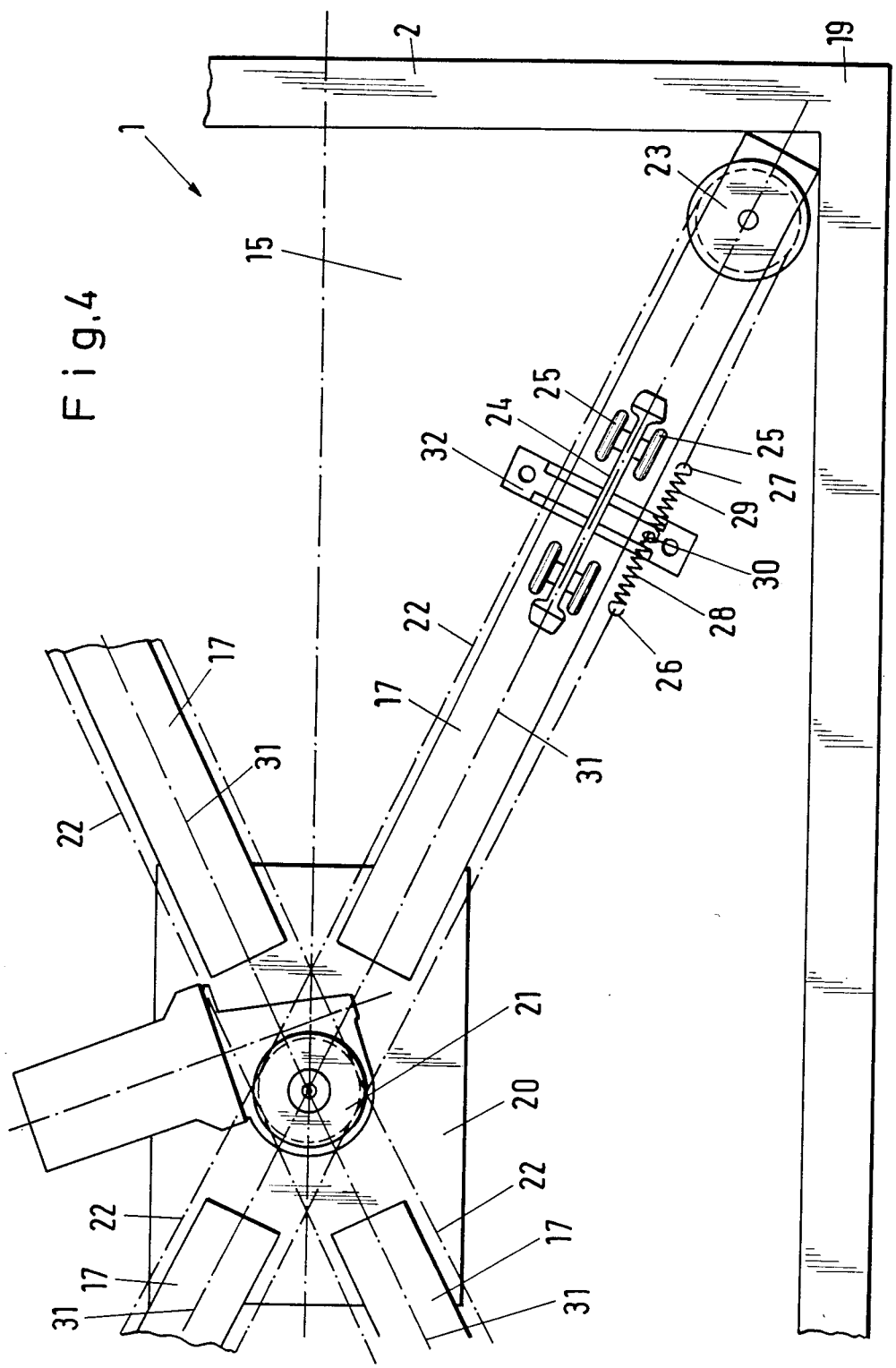

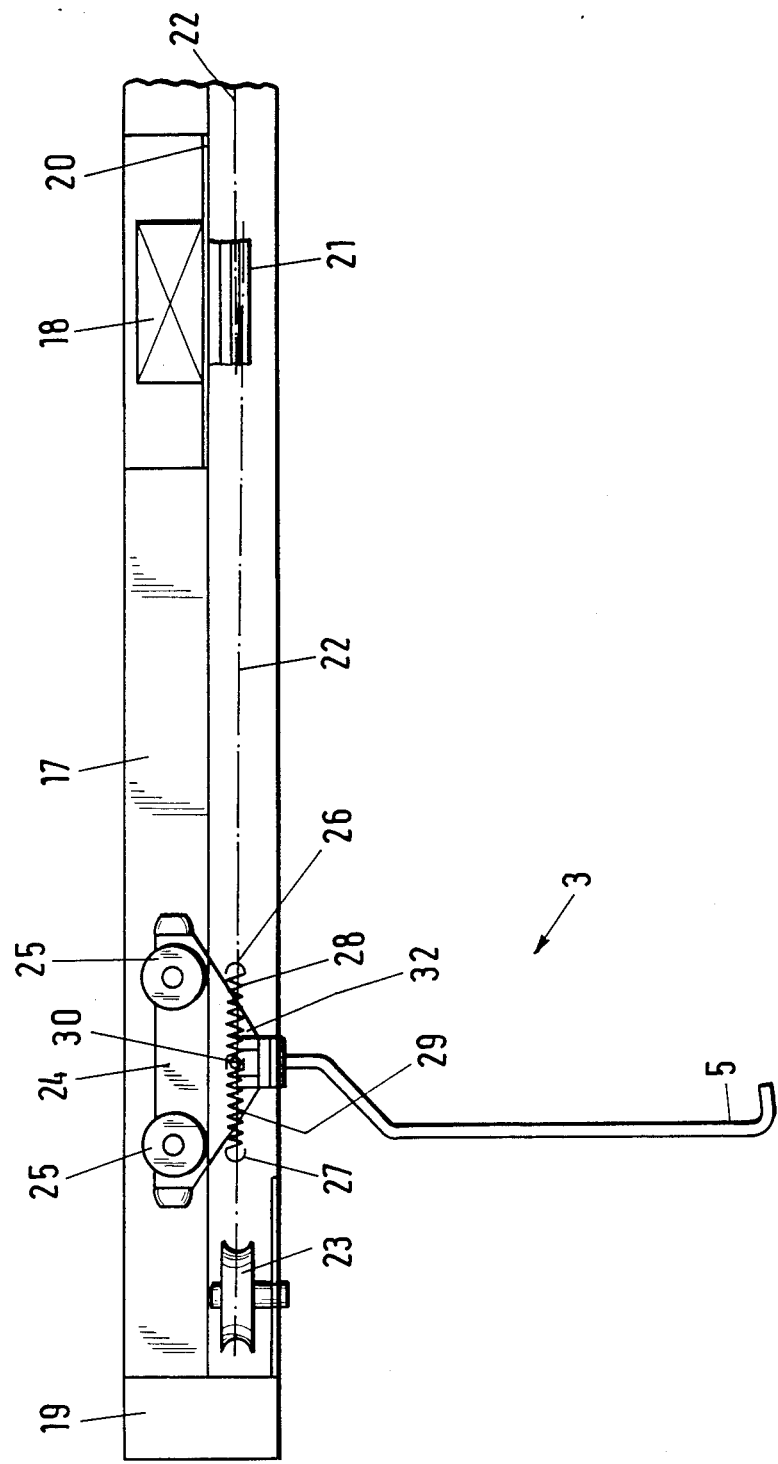

GRIPPING DEVICE

BACKGROUND OF THE INVENTION

The present invention relates to a gripping device for supporting caps or the like supporting tops superimposed on the free upper ends of concrete mouldings such as concrete socket pipes standing upright.

Concrete socket-pipes are provided with supporting caps at their upper ends, after the particular moulding operation, for protecting the upper ends of the pipes from damage and for ensuring that the upper ends of the pipes set true to shape. After the socket pipes have reached a sufficient inherent stability, the supporting caps have hitherto been removed by hand. This has involved a considerable amount of effort and can only be effected with difficulty, particularly in the case of long pipes.

SUMMARY OF THE INVENTION

It is an object of the present invention to provide a gripping device whereby the supporting caps can be reliably removed even from concrete mouldings arranged one behind the other and side by side and with unequal positions of the pipe ends, while excluding the risk of damage caused as a result. In order to solve this problem, the gripping device according to the present invention comprises at least one group of gripping arms which are supported on a supporting frame and which can be moved inwards, by means of a common drive, out of an initial position into a position of engagement with a supporting cap, the movement of the gripping arms being capable of being stopped independently of one another.

Supporting caps can be reliably removed even from concrete mouldings arranged side by side and one behind the other during the setting process, by a gripping device according to the present invention. Differences in position of the upper ends of the mouldings, for example caused by settling phenomena during the setting, are compensated for by the gripping device itself in that the movement of all the gripping arms of a group of gripping arms is stopped in their positions of engagement with the supporting cap until all the gripping arms of the group are resting against the supporting cap. Forces which might lead to damage to the concrete mouldings or even to overturning of the mouldings, do not arise. A gripping device according to the present invention can therefore be positioned, for a removal operation, at the appropriate setting positions of the mouldings regardless of differences in position of the upper ends of the mouldings.

Altogether, therefore, a gripping device of the present invention is particularly suitable for connection to a numerically controlled transport and lifting device for example, so that the supporting caps can be reliably removed, in an automated manner, and in addition be set down at predetermined places or re-inserted in concrete mouldings which have not yet set. The necessary expenditure on construction is small. As a result of the independent stopping capability of the gripping arms of a group of gripping arms associated with the supporting cap of a concrete moulding, despite non-uniform positioning of the ends among the concrete mouldings continuously formed in an automated production process, for example, and set in series, the necessary expenditure on control is restricted to the positioning of the gripping device at the particular setting co-ordinates of a series of concrete mouldings, and the necessary lifting movement and actuation of the gripping-arm drive. Thus a completely automated production of concrete socket-pipes, for example, is rendered possible, in conjunction with automated moulding operations with a controlled flow of material.

For the further rationalization of the, for example, automated removal operation of the supporting caps, the supporting frame of the gripping device is preferably provided with a plurality of groups of gripping arms arranged side by side for the simultaneous removal of the supporting caps from a plurality of concrete mouldings. As a ressult of the independent stopping capability of the gripping arms of each group of gripping arms, a reliable, simultaneous removal of the supporting caps is ensured, despite different positioning of the ends.

Further features and advantages of the present invention are apparent from the appended claims, and the following description and accompanying drawings which illustrate one embodiment of gripping device according to the present invention in more detail by way of example.

BRIEF DESCRIPTION OF THE DRAWINGS

FIG. 1 shows a diagrammatic side view of a gripping device of the present invention connected to a numerically controlled lifting and transport device;

FIG. 2 shows a diagrammatic plan view of the gripping device provided with two groups of gripping arms;

FIG. 3 shows a longitudinal centre section of the gripping device on line III—III in FIG. 2;

FIG. 4 shows a detailed, enlarged, diagrammatic illustration of the supporting-frame segment, of the travelling carriage of the drive, and of the runway rail of the gripping arm;

FIG. 5 shows an enlarged diagrammatic side view of the gripping arm guided for transport in the runway rail.

DESCRIPTION OF THE PREFERRED EMBODIMENTS

Figure 6:
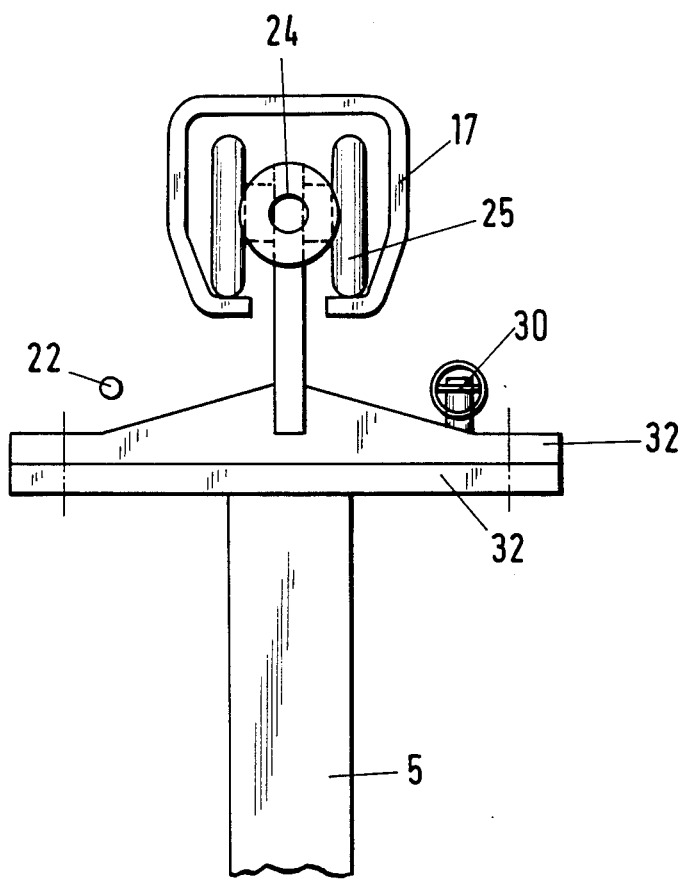
FIG. 6 shows an enlarged cross-sectional illustration of the travelling carriage of a gripping arm, which can be transported in the runway rail.

Only the elements of the gripping device necessary for an immediate understanding of the present invention are illustrated in the accompanying drawings and parts acting in the same way are provided with the same reference numerals.

With reference now to the accompanying drawings, the gripping device designated as a whole by 1 in the drawings comprises a supporting frame 2 on which, in the example illustrated, a total of two groups 3 and 4 of gripping arms 5 and 6 are supported. As FIG. 1 illustrates, a connection 7 is provided at the upper side of the supporting frame 2 and is connected to the lifting arm 8 of a numerically controlled lifting and transport unit designated as a whole by 9. The transverse arm 10 of the lifting and transport unit 9 is held for horizontal movement on a support 11.

In FIGS. 1 and 3, concrete socket-pipes 12 standing upright are indicated which carry supporting caps 13 at their free upper ends. These supporting caps 13 are provided, at their outer faces, with gripping edges 14 for the application of the gripping arms 5 of hook-shaped construction. The concrete socket-pipes 12 are moulded in a continuous production process, provided with supporting caps after the moulding operation and allowed to set standing upright in continuous rows.

The supporting frame 2 is provided with rectangular supporting-frame segments 15 and 16 which are arranged side by side and each of which carries a group of gripping arms 5, 6 for the simultaneous removal of supporting caps 13 of the two concrete socket-pipes 12 arranged side by side. The gripping arms 5 and 6 of the two groups 3 and 4 of gripping arms are each guided for horizontal movement in runway rails 17 fixed to the supporting frame 2 by means of a common drive 18. In the example illustrated, each group 3 to 4 of gripping arms comprises a total of four gripping arms. The runway rails 17 are aligned diagonally inwards from corner regions 19 in the supporting-frame segments 15 and 16 and extend as far as a central drive carrier-plate 20. As a result of this diagonal alignment of the runway rails 17 in the rectangular supporting-frame segments 15 and 16, a travel distance of the gripping arms 5, 6 results which renders possible the removal of a plurality of supporting caps with different diameters and considerable differences in position of the ends. As a result of the arrangement of the runway rails opposite one another, assurance is provided that no forces varying the position arise during the engagement of the gripping arms 5. Instead of the gripping arms 5 which can be transported in the horizontal runway rails 17, pivotable gripping arms may also be provided for example.

In the example illustrated, the runway rails 17 are secured direct to the supporting frame 2 and the drive carrier-plate 20 is connected to the supporting frame 2 via the runway rails 17. If a movable arrangement of the individual runway rails 17 of the supporting-frame segments 15 and 16 is desired in order to vary the spacing of the groups 3 and 4 of gripping arms, the gripping arms 5, 6 may appropriately be guided for displacement in a holding means secured to the supporting frame 2.

The drive 18 of each group 3 and 4 of gripping arms is provided, at its under side, with a driving pulley 21 which is constructed in the form of a multiple belt pulley and on which the four driving bands 22 of the individual gripping arms 5 and 6 are guided in each case. Provided at each of the outer end regions of the runway rails 17 is a return pulley 23 at which the driving bands 22 of the particular gripping arms 5, 6 are turned round. The driving bands 22 are taken to the gripping arms 5, which are held on travelling carriages 24 and can be transported in runway rails 17 through rollers 25, and are each fixed to the gripping arm 5 by means of a spring 28 and 29 on a holding means 30 of the travelling carriage 25 at their ends 26 and 27 situated opposite the travelling carriage 24. The travelling carriage 24 comprises a transverse support 32 which projects transversely to the longitudinal axis 31 of the travelling carriage and which extends below the runway rail 17 of C-shaped cross-section and is adapted, with regard to its transverse dimensions, to the diameter of the multiple belt pulley 21 and the return pulley 23.

As a result of the sprung securing of the ends 26 and 27 of the driving band 22, each driving connection of the gripping arms 5, 6 is resiliently constructed as a whole. As a result of the resilient construction of the driving connection, the gripping arms can be transported, by the common drive 18 from their initial position shown in FIG. 5 into their position of engagement on a supporting cap and can be stopped there by the particular spring excursion independently of other gripping arms 5 or 6 of the particular group 3 or 4 of gripping arms.

What we claim is:

1. Gripping apparatus for gripping and supporting objects superimposed on the upper ends of upstanding pipes, comprising a support frame, a plurality of arm-support means mounted on said support frame, a plurality of gripping arm means, mounting means mounting each of said gripping arm means on said arm-support means for movement along said arm-support means, common drive means, and a plurality of resilient means operatively connecting each of said gripping arm means to said common drive means, said common drive means and said plurality of resilient means being operable to move said gripping arm means along said arm support means in a gripping direction toward said object to be gripped to engage said object, each of said resilient means being resiliently operable to permit each gripping arm means to move different distances in said gripping direction such that when the movement of one gripping arm means is arrested upon engagement with said object, other gripping means continue to move in said gripping direction until said other gripping arm means engage said object.

2. Gripping apparatus for gripping and supporting objects comprising a support frame, a plurality of arm-support means mounted on said support frame, a plurality of gripping arm means, mounting means mounting each of said gripping arm means on said arm-support means for movement along said arm-support means, common drive means mounted on said support frame, and a plurality of resilient means operatively connecting each of said grippig arm means to said common drive means, said common drive means and said plurality of resilient means being operable to move said gripping arm means along said arm-support means in a gripping direction toward an object to be gripped to engage said object, each of said resilient means being resiliently operable to permit each gripping arm means to move different distances in said gripping direction such that when the movement of one gripping arm means is stopped upon engagement with said object, other gripping arm means continue to move in said gripping direction until said other gripping arms means engage said object with said resilient means connected to said other gripping arm means being resiliently operable to permit said continued movement of said other gripping arm means.

3. Gripping apparatus according to claim 2, wherein said arm-support means comprises a plurality of rails emanating from a center, said gripping arm means comprising carriages movable along said rails such that said carriages move toward said center when said gripping arm means move in said gripping direction.

4. Gripping apparatus according to claim 3, wherein said common drive means comprises a rotary drive member rotatably mounted at said center, drive bands driven by said rotary drive member, said resilient means being connected between said drive bands and said carriages.

5. Gripping apparatus according to claim 4, wherein there is one common rotary drive member which drives a plurality of drive bands with each drive band extending along each of said rails.

6. Gripping apparatus according to claim 4, wherein each of said drive bands has one end connected to said resilient means, and further comprising second resilient means connected between the other end of each drive band and its respective carriage.

7. Gripping apparatus according to claim 4, wherein said carriage comprises rollers which roll on said rails.

8. Gripping apparatus according to claim 2, wherein said resilient means comprises springs which resiliently elongate when one of said gripping arm means is stopped upon engaging an object and said other gripping arm means continue to move in said gripping direction while said common rotary drive member continues to move said other gripping arm means.

9. Gripping apparatus according to claim 2, wherein said support frame has a rectangular configuration, said arm-support means extending along diagonal lines of said rectangular configuration, said diagonal lines intersecting at a center of said rectangular configuration, said support frame having a drive carrier plate disposed at said center and connected to each of said arm-support means, said drive means being rotatably mounted on said drive carrier plate for rotation about an axis coincident with said center.

10. Gripping apparatus according to claim 9, wherein each of said arm-support means has an inner end and an outer end, said inner end being located closest to said center, said common drive means comprising a common pulley rotatable about an axis coincident with said center of said rectangular configuration, said drive means further comprising outer pulleys mounted on the outer ends of said arm-support means, and drive bands passing about said common pulley and each of said outer pulleys.

11. Gripping apparatus according to claim 9, wherein two of said support frames are provided disposed adjacent to one another.

12. Gripping apparatus according to claim 2, wherein said common drive means is rotatable in one direction to move said gripping arm means in said gripping direction, said common drive means being rotatable in a direction opposite to said one direction to move said gripping arm means in a direction opposite to said gripping direction.

* * * * *